United States Patent [19]
Gordon

[11] Patent Number: 5,433,551
[45] Date of Patent: Jul. 18, 1995

[54] TELESCOPING ROD ASSEMBLY

[76] Inventor: Larry D. Gordon, 2651 Athens Way NE., Bremerton, Wash.

[21] Appl. No.: 180,851

[22] Filed: Jan. 12, 1994

[51] Int. Cl.⁶ .............................. A47H 1/08; F16B 7/14
[52] U.S. Cl. ..................................... 403/377; 403/374; 403/368; 403/22; 403/109; 16/96 R; 211/105.4
[58] Field of Search ............... 292/163, 175, 164, 338, 292/339; 297/344.12, 344.18; 211/105.4; 248/342, 343, 344, 258, 270; 16/96 R, 115; 4/610; 403/109, 322, 321, 367, 368, 370, 374, 377, 378, 22; 411/354, 361

[56] References Cited

U.S. PATENT DOCUMENTS

| | | | |
|---|---|---|---|
| 989,069 | 4/1911 | Siewert | 403/109 X |
| 1,030,592 | 6/1912 | Leland . | |
| 2,523,041 | 9/1950 | McKenzie | 16/115 X |
| 2,653,840 | 9/1953 | Bitzer et al. . | |
| 2,661,850 | 12/1953 | Fowler et al. | 211/105.4 |
| 2,864,110 | 12/1958 | Bruger . | |
| 3,222,772 | 12/1965 | Leyner . | |
| 3,284,114 | 11/1966 | McCord et al. | 403/370 |
| 3,380,097 | 4/1968 | Pharris . | |
| 3,515,418 | 6/1970 | Nielsen, Jr. . | |
| 3,698,259 | 10/1972 | Reeves . | |
| 3,726,522 | 4/1973 | Silberman . | |
| 4,316,675 | 2/1982 | Melicque | 403/22 |
| 4,329,076 | 5/1982 | Coreth | 403/109 |
| 4,363,603 | 12/1982 | Petersen . | |
| 4,572,291 | 2/1986 | Robison . | |
| 4,575,277 | 3/1986 | Dickey et al. . | |
| 4,619,548 | 10/1986 | Kazaoka et al. . | |
| 4,623,277 | 11/1986 | Wayne | 403/370 X |
| 4,900,182 | 2/1990 | Stillwagon . | |

Primary Examiner—Eric K. Nicholson
Assistant Examiner—Anthony Knight
Attorney, Agent, or Firm—Jensen & Puntigam

[57] ABSTRACT

A telescoping rod assembly (10) including an outer tube section (12) and an inner tube section (14) that is slidable disposed inside the outer tube section. The tube sections are locked into position relative to each other by a packing washer (18) that is fitted around the inner tube section adjacent the open end of the outer tube and a locknut (16) that is fitted around a inner tube and is rotatably secured to the open end of the outer tube. The inner tube and the locknut are provided with complementary outer and inner non-circular surfaces so as to couple the two members together so that they rotate in unison. The locknut can be tightened down over the packing washer to secure the tube sections into position relative to each other by the simple act of either rotating the outer tube or the inner tube.

20 Claims, 3 Drawing Sheets

TELESCOPING ROD ASSEMBLY

TECHNICAL FIELD

This invention relates generally to a telescoping rod assembly and, more particularly, to a quick release and quick securing telescoping rod assembly.

BACKGROUND OF THE INVENTION

Telescoping rod assemblies are incorporated into many mechanical devices. These assemblies typically include an outer, female, tubular section into which a inner, male, tubular section is seated and a locking device for holding the tubes in a rigid connection relative to each other. Telescoping rods employed as the legs of tripods and monopods provide support for cameras and scientific instruments. Still other telescoping rod assemblies are employed as extension handles for tools such as paint rollers and the like. Telescoping rods are also used in other assemblies, including permanent and temporary support beams, such as drapery rods. Thus, telescoping rods are used wherever there is a need to provide variable length support rods.

A disadvantage of many current telescoping rods is that it is a relatively complicated procedure to set their overall length. A telescoping rod is typically configured so that after the positions of the inner and outer tube sections are adjusted relative to each other, one or both of the tube sections needs to be held in a static position while the locking assembly is tightened to secure the tubes. Thus, it usually takes a minimum of two hands to adjust the length of a telescoping rod assembly; one hand to hold one of the tube sections in position relative to the other tube section, and a second hand to secure the locking assembly. In some instances, three hands are required to adjust the assembly; two hands to hold the tube sections in position relative to each other and a third hand to secure the locking assembly. This need to use two hands, and sometimes three hands, to hold a telescoping rod at the desired length while simultaneously locking it in position often makes the rod adjustment and locking processes awkward tasks to perform.

There have been attempts to provide telescoping rod assemblies with locking assemblies that are designed to lock and release the associated rod sections with the rotation of one of the tube sections. A disadvantage of some of these assemblies is that they are composed of numerous parts, one or more of which is often disposed inside both the inner and outer tube sections with which they are associated. As a result, these assemblies have proven to be difficult and expensive to manufacture. Another limitation of these assemblies is that their locking assemblies impose uneven locking forces around the circumferences of the tube sections. This minimizes the ability of these assemblies to hold the tube sections in place when exposed to significant amounts of strain or tension. Consequently, in some environments, both the utility and acceptability of these telescoping rod assemblies has proven to be not much more than that of conventional telescoping rod assemblies.

DISCLOSURE OF THE INVENTION

This invention relates to a new and useful telescoping rod assembly. In particular, this invention relates to a telescoping rod assembly that includes inner and outer rod sections that can be locked and unlocked by simple rotation of one of the sections.

The telescoping rod assembly of this invention includes a tubular shaped outer rod section and an inner rod section that is dimensioned to be slidably located inside the outer rod section. The inner rod section is shaped to have an outer surface that has a non-circular profile. The telescoping rod assembly of this invention further includes a locknut for tightening the tube sections together that is coupled to the end of the outer tube. In one preferred version of the invention, the locknut is threadingly coupled to the outer tube section. The locknut is further shaped so that it has an inside wall, the surface that defines the opening through which the inner tube section slides, with a profile that approximately conforms to the profile of the inner rod section. For example, in one preferred embodiment of the invention, the inner tube surface has a generally round profile that is further shaped to have a number of longitudinally extending spines; the locknut is provided with complementary inwardly directed teeth that are seated in the spines. A packing washer is located underneath the locknut and is disposed between the open end of the outer tube section and the head of the locknut.

The interlocking structural relationship between the inner tube section and the locknut causes these two elements to rotate in unison. Consequently, when one desires to set the length of the telescoping rod assembly of this invention, all that it is necessary to do is to position the tube sections to the appropriate length and then to rotate either one of the tube sections. If the inner tube section is rotated, this motion causes a like rotation of the locknut. This movement causes the locknut to bear towards the outer tube section which results in the compression of the packing washer against the inner tube section so as to secure the inner tube section in place relative to the outer tube section. Alternatively, if the outer tube section is rotated, the threading between the tube section and the locknut forces the tube section toward the locknut, which also results in the compression of the packing washer against the inner tube section and the locking of the inner tube section in place.

Whenever there is a need to reset the length of the telescoping rod assembly of this invention, the tube sections can readily be unlocked by rotating either one of the tube sections or the locknut. This motion releases the compressive forces applied to the packing washer. The release of these forces frees the inner tube section so that it can slide relative to the outer tube section.

Thus, if one of the tube sections of the telescoping rod assembly of this invention is set, the other tube section can usually be both set in position and locked in place by simple one-handed action. If both tube sections need to be secured in position then, at the most, two hands are required to set the rod assembly of this invention; one hand to hold one of the tube sections and the second hand to hold the other tube and rotate it so the locknut locks the tube in place. Thus, the telescoping rod assembly can be easily locked in place or unlocked with a minimal amount of effort.

Another feature of the telescoping rod assembly of this invention is that when the compressive force is imposed against the packing washer, the washer imposes a generally uniformly distributed locking force around the outer surface of the inner tube section. This feature of the telescoping rod assembly of this invention provides the assembly with an enhanced ability to maintain the tube sections in the proper relation to each other when exposed to significant compressive or tension forces.

Furthermore, the telescoping rod assembly of this invention is formed out of a relatively few number of readily machineable or diecast components. Also, the components forming the locking assembly, the locknut and the packing washer, are both disposed around the outer surface of the inner tube section. Thus, the telescoping rod assembly of this invention can be readily and economically manufactured.

BRIEF DESCRIPTION OF THE DRAWINGS

The invention is pointed out with particularity in the claims. The above and further advantages of this invention may be better understood by referring to the following description taken in conjunction with the accompanying drawings in which:

BEST MODE FOR CARRYING OUT THE INVENTION

Figure 1:
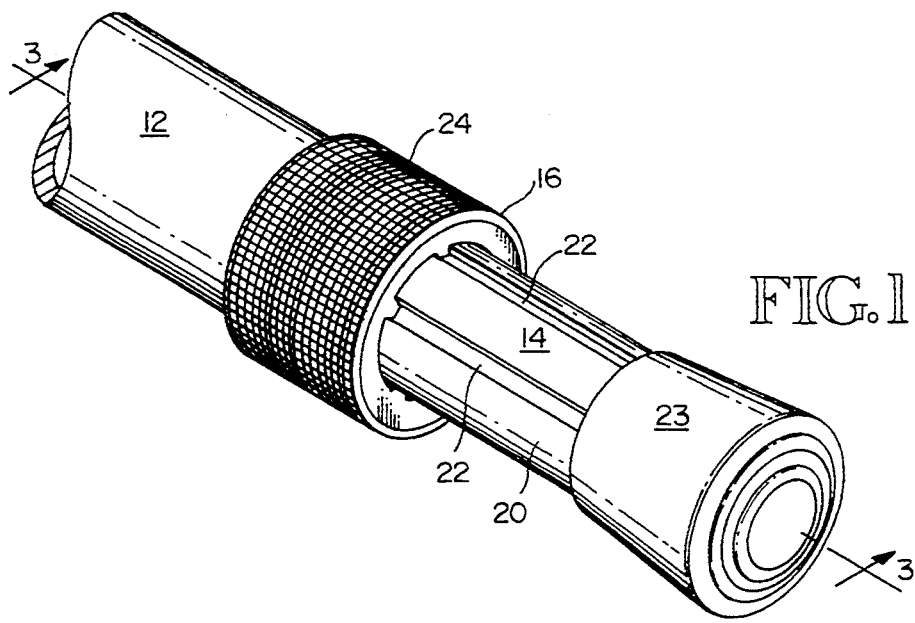
FIG. 1 is a perspective view illustrating a portion of the telescoping rod assembly of this invention.
Figure 2:
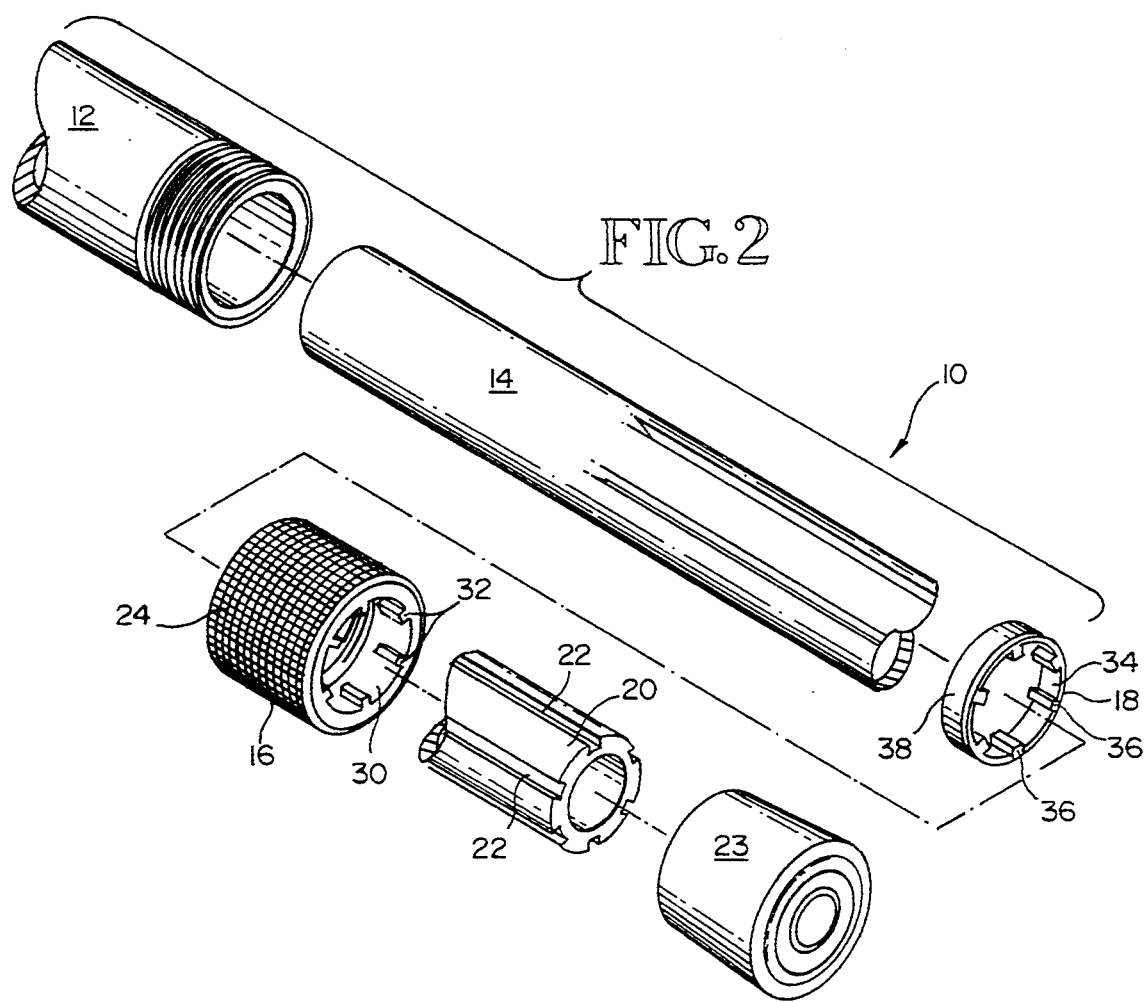
FIG. 2 is an exploded view of the components of the telescoping rod assembly.

FIGS. 1 and 2 illustrate the structure of a telescoping rod assembly 10 of this invention. The assembly 10 includes a relatively large diameter outer, female tube 12 in which a smaller diameter inner, male tube 14 is slidable disposed. The two tube sections 12 and 14 are locked in place relative to each other by a locknut 16 that is adjustably secured over the open end of the outer tube section 12 and a packing washer 18 which is located underneath the locknut and is disposed between the head of the locknut 16 and the end of the outer tube 12.

The outer tube section 12 is in the form of a generally circular hollow tube. The inner tube section 14 is in the form of an elongated rod or tube that has a cross sectional diameter that allows it to freely slide within an outer tube section 12. The inner tube section 14 is shaped so as to have an outer surface 20 with a non-circular profile. In the illustrated version of the invention, inner tube section 14, for example, while having a generally round shape is further formed to have a number of inwardly directed, longitudinally extending splines 22 that extend from a point above the butt end of the tube to the head of the tube. In the illustrated version of the invention, the free end of the inner tube section 14, the end distal from the outer tube section 12, is covered by a cap 23.

Figure 3:
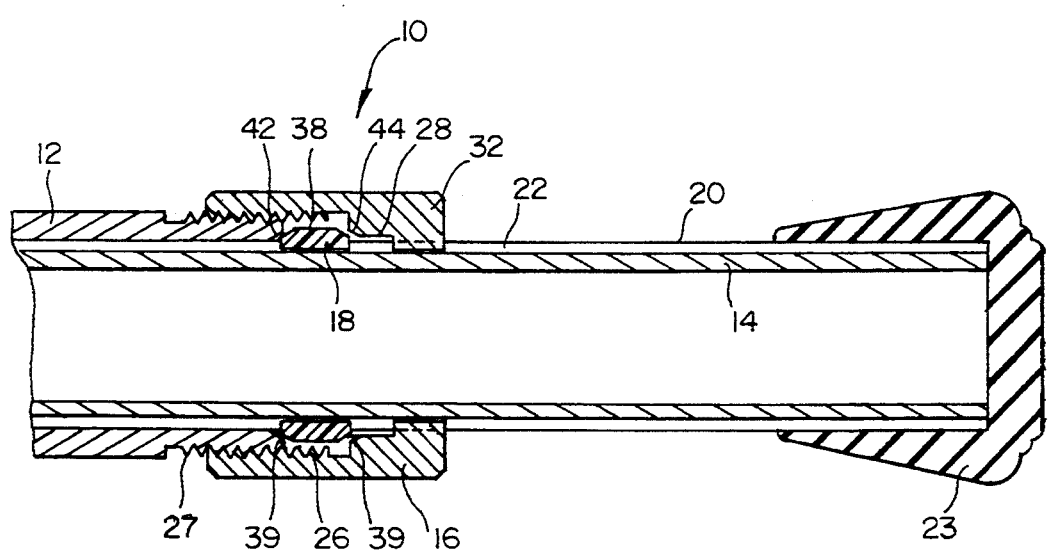
FIG. 3 is a longitudinally oriented cross sectional view of the telescoping rod assembly of FIG. 1.

Locknut 16, as best seen by FIGS. 2 and 3, is in the form of a cylindrical, hollow member that is formed with a knurled outer surface 24 to facilitate its manual rotation. The locknut 16 is further formed with a threaded inner surface 26 that is designed to couple the nut over complementary threading 27 formed along the end of the outer tube section 12 through which the inner tube section 14 extends. Locknut 16 is further formed with an inwardly directed annular lip 28 that is located above the portion of the locknut that defines the threaded surface 26. The locknut 16 is shaped so that lip 28 has an inside surface 30 with a profile complementary to the profile of the outer surface 20 of the inner tube section 14. In the illustrated version of the invention, the inner surface 30 of lip 28 is provided with inwardly directed teeth 32 that interlock into the splines 22 formed in the inner tube section 14. Locknut 16 is further shaped so that inner surface 30 is spaced a slight distance away from the outer surface 20 of the inner tube section 14 to ensure that when the rod assembly 12 is in the unlocked state, the inner tube section can slide freely relative to the locknut.

Packing washer 18 is formed from compressible matter such as rubber or plastic and is generally ring-shaped in structure. The packing washer 18 is formed to have an inner surface 34 that is complementary in profile to the shape of the adjacent outer surface 20 of the inner tube section 14. Thus, in the depicted version of the invention, the packing washer 18 is provided with inwardly directed teeth 36 that extend into the splines 22 formed in the inner tube section 14. Packing washer 18 is further formed to have an outer surface 38 that, while generally having a linear profile relative to the longitudinal axis of the rod assembly 10, has an inwardly directed beveled surfaces 39 along both its top and bottom edges. The packing washer 18 is seated between an inwardly directed step 42 integrally formed around the inside of the outer tube section 12 immediately below the tube opening and a step 44 located inside the locknut 16 and formed by the transition region between the threaded surface 26 and the lip 28. Steps 42 and 44 are both formed with inwardly tapered profiles which generally conform to the profile of the adjacent beveled surfaces 39 of the locknut. As depicted by FIG. 3, when the locknut 16 is tightened down over the outer tube section 12, the resultant compression of the packing washer 18 causes the washer to bear inward and secure the inner tube section 14 in place.

The inner tubular section 14 and locknut 16 of the telescoping rod assembly 10 of this invention are formed with complementary non-circular outer and inner surfaces 20 and 30, respectively. Consequently, these two components rotate in unison. Thus, locknut 16 can be screwed in place to lock the tube sections in position or unscrewed to release the tube sections by simply rotating the inner tube section 14. Alternatively, since locknut 16 is threadingly secured to outer tube section 12, the same results can be obtained by rotating either the outer tube section or the locknut relative to the other component so as to screw the locknut against the tube section 12. Thus, the tube sections 12 and 14 forming the telescoping rod assembly 10 of this invention can be secured or unlocked by the simple rotation of either of the tube sections or the locknut 16. Therefore, assuming one of the tube sections 12 or 14 is set in position, only a single hand is needed to both position the other tube section 14 or 12 and lock it in place. In instances when neither tube section 12 or 14 are stable, then just two hands are needed to set the assembly 10; one hand to hold one tube section and the other to set the second tube section and lock it in place. The tube sections can be unlocked and/or collapsed by the reverse of the simple one- or two-handed motions with which the assembly is locked in place. Thus, the telescoping rod assembly 10 of this invention can be quickly locked in place or unlocked with a minimal amount of effort and dexterity.

Another feature of the telescoping rod assembly 10 of this invention is that when the packing washer 18 is compressed, the washer imposes a substantially uniformly distributed compressive locking force around the circumference of the inner tubular section 14. The uniform distribution of this force enhances the ability of the assembly 10 to remain rigid when exposed to significant compressive or tension forces.

A further feature of this assembly 10 is that it is composed of a relatively few number of parts and that the elements that serve to lock the two sections 12 and 14 together, the locknut 16 and packing washer 18, are both located around the outside surface 20 of the inner tubular section 14. Thus, the structure of these components, as well as their location, serve to make the telescoping rod assembly 10 of this invention relatively easy and economical to manufacture. Still another feature of assembly 10 is that the splines 22 end before the base or butt end of the inner tube section 14, the end that is seated inside the outer tube section 12. An advantage of this feature is that since the locknut teeth 36 are seated in the splines, once the inner tube section 14 is extended to the point where the teeth 36 are at the end of the splines 22, further extension of the inner tube section 14 is blocked. This prevents the inadvertent complete removal of the inner tube 14 from the outer tube section 12.

Figure 4:
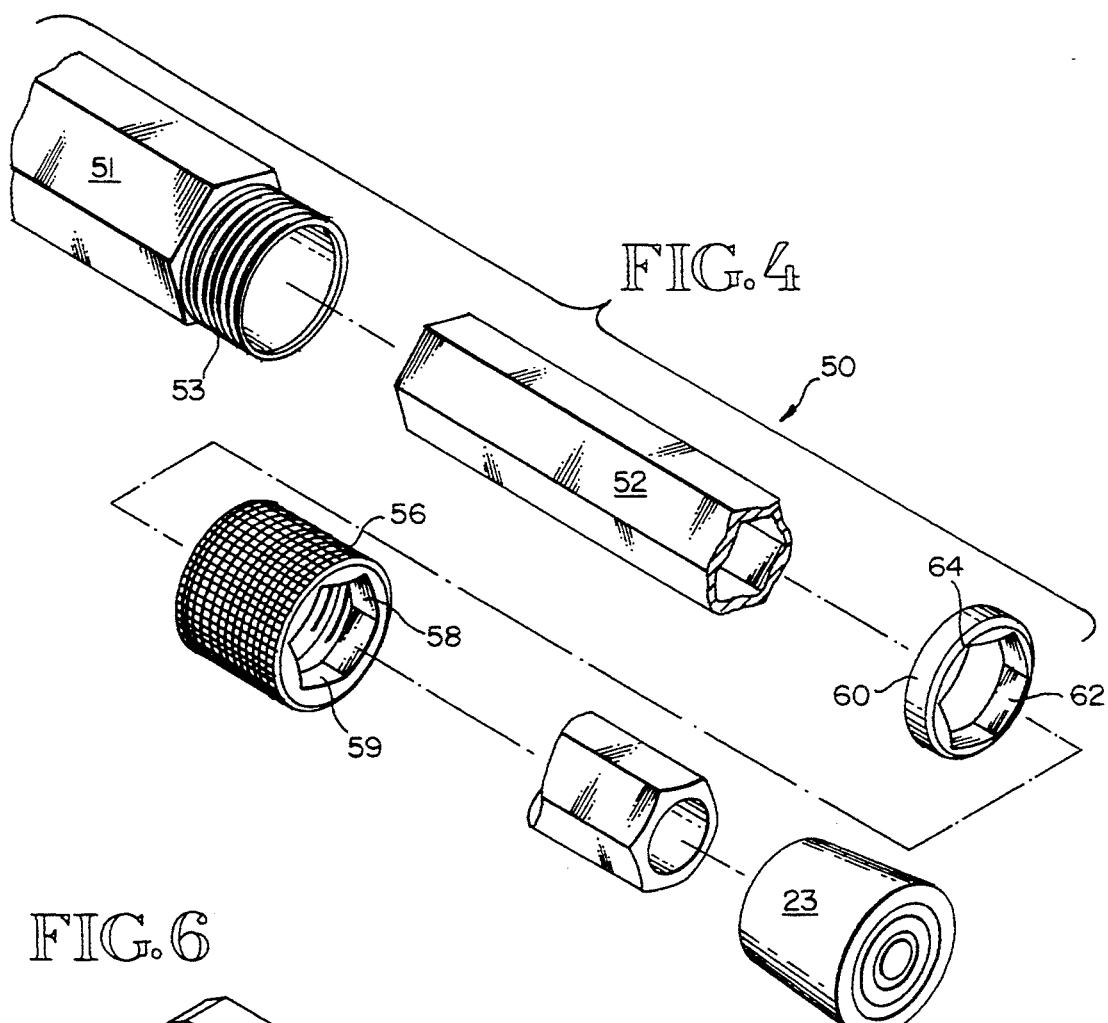
FIG. 4 is an exploded view illustrating a portion of an alternative version of the telescoping rod assembly of this invention.

FIG. 4 is a perspective view of a portion of an alternative telescoping rod assembly 50 of this invention. Assembly 50 includes an outer tube section 51 and an inner tube section 53 that is slidable disposed inside the outer tube section. Both tube sections 51 and 52 are formed with generally hexagonal profiles. A locknut 56, similar in function to locknut 12, is threadingly coupled over the end of outer tube section 51. To facilitate the coupling of the locknut 56 to the outer tube section 51, the end of the outer tube section is formed with a rounded end that has a threaded outer surface 53. Locknut 56 is further formed so as to have an inwardly directed lip 58 that is shaped so as to have an inner surface 59 with a hexagonal profile that is complementary to the profile of the inner tube section 52.

A packing washer 60 is fitted around the inner tube section 52 and is located underneath the locknut 56 adjacent the open end of the outer tube section 51. Packing washer 60 is formed to have an inner surface 62 with a hexagonal profile that conforms to the shape of the outer surface of the inner tube section 52. The outer edges of the packing washer 60 are formed with inwardly directed beveled surfaces 64. The outer tube section 51 and the locknut 58 are formed with steps similar to steps 42 and 44 of the first described embodiment of this invention which define a space in which the packing washer 60 is disposed.

An advantage of telescoping rod assembly 50 of this invention is that the hexagonal profile of the outer and inner tube sections 51 and 52, respectively, facilitate the tightening and unlocking of the assembly with a complementary fastening tool such as an open ended wrench. A related advantage to this assembly 50 is since the tube sections 51 and 52 have hexagonal profiles along the whole of their bodies, the fastening tool can be placed anywhere along the tubes to aid in either the locking or unlocking of the assembly.

Figure 5:
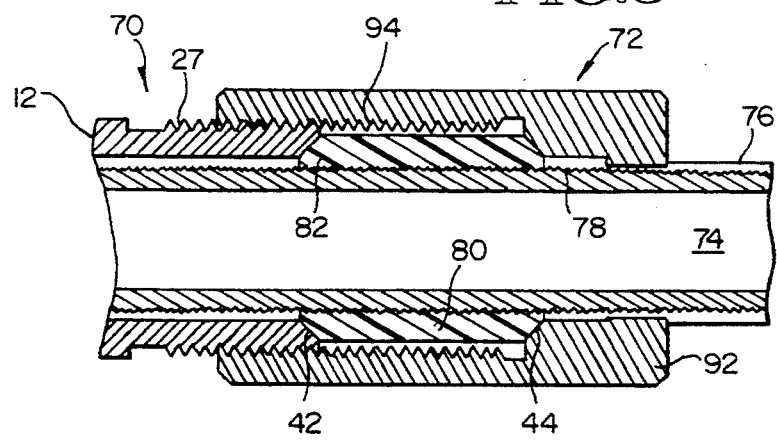
FIG. 5 is a cross sectional view of an alternative locking assembly that can be integrated into the telescoping rod assembly of this invention.

FIG. 5 illustrates an alternative rod assembly 70 of this invention that incorporates a locking assembly 72 that holds the tubes rigid when exposed to extremely sever compressive or tension forces. Rod assembly 70 includes the basic outer tube section 12. A modified inner tube section 74 is slidably seated inside the outer tube section 12. Inner tube section 74 is formed with longitudinally extending splines 76. The inner tube section 74 is further formed so that the portions of the surfaces of the tube that forms the bases of the splines are shaped to have sawteeth 78 that run the length of the splines 76.

Figure 6:
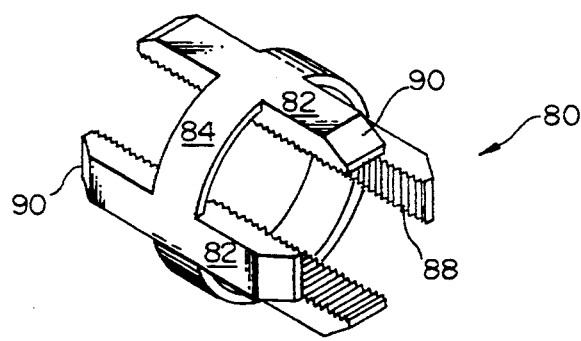
FIG. 6 is a perspective view of the packing washer employed in the locking assembly of FIG. 5.

The locking assembly 72 of this version of the invention includes a packing washer 80 with a set of arms 82 each of which is seated in one of the splines 76 formed in the inner tube section 74. As best seen by reference to FIG. 6, packing washer 80 has a ring shaped center body 84. Arms 82 are attached to the washer center body 84 such that each arm extends perpendicularly across the center body and the arms collectively are uniformly spaced around the center body. The inner surface of each arm 82 is formed with sawteeth 88 that are complementary in profile to the sawteeth 78 in the base of the splines 76. The opposed outer ends of each arm 82 are formed with inwardly tapered surfaces 90. Packing washer 80 is formed out of plastic or other flexible material and is shaped so that when the washer is the uncompressed state, the washer has an inside diameter wide enough that the inner surfaces of the arms are spaced away from complementary sawteeth in the base of the inner tube section splines 76.

A locknut 92 is threadingly coupled to the end of the outer tube 12 such that it is located over the packing washer 80. Locknut 92 is an alternative version of the locknut 16 that has an interior threaded surface 94 of extended length in order to accommodate the entire length of each packing washer arm 82 underneath the body of the locknut.

When locknut 92 is loosely threaded to the complementary outer tube section 12, the packing washer 80 is in an uncompressed state. The sawteeth 88 integral with the packing washer arms 82 are spaced away from the sawteeth 78 formed at the base of the splines 76. This allows the inner and outer tubes 12 and 74, respectively, to be freely moved relative to each other. Once the relative positions of the tubes 12 and 74 are set, the locknut 92 and outer tube 12 are advanced toward each other as previously described. The movement of the locknut 92 and the outer tube 12 toward each other causes the packing washer arms 82 to be compressed inward so that the arm sawteeth 88 engage the sawteeth 78 in the inner tube splines 76. The engagement of the packing washer arms 82 with the sawteeth 78 in the base of the inner tube splines 76 serves to securely lock the tubes 12 and 74 in position relative to one another. The interlocking of the complementary sawteeth 78 and 88 maintains the tubes in a rigid relationship even when the assembly 70 is exposed to sever compressive or tension forces.

It should be understood that the foregoing description of the invention is for the purposes of illustration only. Other versions of the invention may include features different from those that have been described. For example, in some embodiments of the invention, it may be desirable to provide an outer tube that has an external profile different from the profile of the inner tube. It should also be recognized that the outer surface of the inner tube and the inner surface of the associated locknut may differ greatly from that which is described; all that is required is that these surfaces be configured to define interlocking members that cause these components to rotate in unison while still providing telescoping action between the two members. Furthermore, it should also be recognized that in some embodiments of the invention the locknut and inner tube could be arranged so that the locknut will only selectively engage and rotate in unison with the inner tube. This could be accomplished, for example, by eliminating the locknut teeth that are dimensioned to fit in the seat in the complementary splines formed in the inner tube and, instead, provide retractable set screws. These set screws, in addition to retracting away from the inner tube section, can be arranged to abut and physically interlock with the inner tube section. The advantage of this arrangement is that it would make it possible to not only lock the tube assembly of this invention in place to secure the tubes in position relative to inhibit the easy unlocking of the assembly. This feature of the invention prevents the unauthorized tampering of the assembly. Also, in some versions of the invention, the packing washer may differ greatly in structure than what has been described. For instance, it may be desirable to simply employ a ring-shaped packing structure that does not have any teeth or correspond to the splines formed in the associated inner tube.

It should also be recognized that while the described versions of the invention only have two tube sections, other versions of the invention may have three or more interlocking tube sections. In these versions of the inventions, the adjacent interconnected tube sections may all be locked in place using separate locking assembly of this invention. Alternatively, in these versions of the inventions some of the adjacent interconnected tube sections may be locked in place using the assembly of this invention while other tube sections may be locked in place using alternative locking systems.

Therefore, it should be recognized that the object of the appended claims is to cover all such variations and modifications that come within the true spirit and scope of the invention.

I claim:

1. A telescoping rod assembly including:
   an outer tube having an open end;
   an inner tube slidably disposed in said open end of said outer tube;
   a locknut disposed over said open end of said outer tube and around said inner tube, said locknut being releasably coupled to said outer tube so that said locknut can be selectively moved longitudinally relative to said outer tube by the rotation of either said locknut or said outer tube, and said locknut being further configured to interlock with said inner tube so that said locknut and said inner tube rotate in unison; and
   a locking element disposed between said inner tube and said outer tube underneath said locknut for imposing a compressive force on said inner tube when said locknut is moved toward said outer tube.

2. The telescoping rod assembly according to claim 1, wherein said inner tube is formed with an outer surface shaped to have a non-circular profile and said locknut is formed with an inner surface having a non-circular profile complementary to said profile of said outer surface of said inner tube.

3. The telescoping rod assembly of claim 2, wherein said outer surface of said inner tube has a generally circular shape and is further formed to have at least one longitudinally extending spline and said locknut is formed to have at least one inwardly extending tooth dimensioned to extend into said inner tube spline.

4. The telescoping rod assembly of claim 3, wherein said inner tube is formed to have teeth located in said at least one spline; and said locking element includes a member positioned to be disposed in said at least one inner tube spline, said locking element member including an inner surface formed with teeth positioned so that when said locking element is exposed to a compressive force, said locking element teeth engage and interlock with said inner tube spline teeth.

5. The telescoping rod assembly of claim 2, where said outer surface of said inner tube is shaped generally in the form of a polygon and said inner surface of said locknut has a shape generally in the form of a polygon complementary to the profile of the outer surface of said inner tube.

6. The telescoping rod assembly of claim 2, wherein said locking element is in the form of a compressible washer.

7. The telescoping rod assembly according to claim 6, wherein: said outer tube and said locknut are formed with complementary threading to couple said locknut to said outer tube; said locknut is further formed with an inwardly directed annular lip that has an inner surface spaced inward from said locknut threading so as to define a step between said threading and said lip; said outer tube open end is formed with a step located immediately below said outer end; and said compressible washer is located between said outer tube step and said locknut step.

8. The telescoping rod assembly of claim 7, wherein: said inner tube is formed with a plurality of longitudinally extending splines and said locknut has a plurality of inwardly extending teeth, each said locknut tooth being positioned to extend into a separate one of said inner tube splines; said inner tube is formed to have teeth located in said splines; and said compressible washer includes a plurality of members, each said member being positioned in one of said splines, said compressible washer members including inner surfaces formed with teeth positioned to engage and interlock with said inner tube spline teeth when said locking element is exposed to a compressive force.

9. The telescoping rod assembly of claim 8, wherein compressible washer include a circular main body and said compressible washer members are in the form of a plurality of arms that are attached to said main body, each said arm extending perpendicularly relative to said washer main body.

10. The telescoping rod assembly according to claim 2, wherein: said outer surface of said inner tube is formed with a set of teeth; and said locking element has inner surface formed with a set of teeth complementary to said teeth formed on said outer surface of said inner tube, and said locking element is positioned so that when said locking element is exposed to a compressive force, said locking element teeth engage said inner tube teeth.

11. The telescoping rod assembly of claim 1, wherein said locking element is in the form of a compressible washer.

12. The telescoping rod assembly according to claim 1, wherein: said outer tube and said locknut are formed with complementary threading so as to couple said locknut to said outer tube; said locknut is further formed with an inwardly directed annular lip that has an inner surface spaced inward from said locknut threading so as to define a step between said threading and said lip; said outer tube open end is formed with a step located immediately below said outer end; and said locking element is located between said outer tube step and said locknut step.

13. A telescoping rod assembly including:
an outer tube and an inner tube slidably disposed in said outer tube, said outer tube having an open end through which said inner tube extends; and
a locking assembly including a compressible locking element located adjacent said open end of said outer tube and disposed around said inner tube and a locknut secured over said open end of said outer tube and around said inner tube and said locking element, said locknut being releasably coupled to said outer tube so that said locknut can be selectively moved longitudinally relative to said outer tube by the rotation of either said locknut or said outer tube and said locknut being coupled to said inner tube to rotate in unison with said inner tube.

14. The telescoping rod assembly according to claim 13, wherein: said inner tube is formed with an outer surface shaped so as to have a non-circular profile and said locknut is formed with an inner surface having a non-circular profile complementary to said profile of said outer surface of said inner tube.

15. The telescoping rod assembly of claim 14, where said outer surface of said inner tube which is shaped generally in the form of a polygon and said inner surface of said locknut has a shape generally in the form of a polygon complementary to the profile of the outer surface of said inner tube.

16. The telescoping rod assembly according to claim 14, wherein said outer tube and said locknut are formed with complementary threading so as to couple said locknut to said outer tube; said locknut is further formed with an inwardly directed annular lip that has an inner surface spaced inward from said locknut threading so as to define a step between said threading and said lip; said outer tube outer end is formed with a step located immediately below said open end; said locking element is located between said outer tube step and said locknut step; and said locking element is formed with a tapered end that is located adjacent said step in said outer tube.

17. The telescoping rod assembly of claim 14, wherein: said inner tube is formed with a plurality of longitudinally extending splines and said locknut has a plurality of inwardly extending teeth, each said locknut tooth being positioned to extend into a separate one of said inner tube splines; said inner tube is formed to have teeth located in said splines; and said compressible washer includes a plurality of members, each said member being positioned in one of said splines, said compressible washer members including inner surfaces formed with teeth positioned to engage and interlock with said inner tube spline teeth when said locking element is exposed to a compressive force.

18. The telescoping rod assembly of claim 13, wherein said outer surface of said inner tube has a generally circular shape and is further formed to have at least one longitudinally extending spline and said locknut is formed to have at least one inwardly extending tooth dimensioned to extend into said inner tube spline.

19. The telescoping rod assembly according to claim 13, wherein said outer tube and said locknut are formed with complementary threading so as to couple said locknut to said outer tube; said locknut is further formed with an inwardly directed annular lip that has an inner surface spaced inward from said locknut threading so as to define a step between said threading and said lip; said outer tube outer end is formed with a step located immediately below said open end; said locking element is located between said outer tube step and said locknut step; and said locking element is formed with a tapered end that is located adjacent said step in said outer tube.

20. The telescoping rod assembly according to claim 13, wherein: said outer surface of said inner tube is formed with a set of teeth; and said locking element has inner surface formed with a set of teeth complementary to said teeth formed on said outer surface of said inner tube, and said locking element is positioned so that when said locking element is exposed to a compressive force, said locking element teeth engage said inner tube teeth.

* * * * *